(12) United States Patent
Mahfouz et al.

(10) Patent No.: US 11,286,822 B2
(45) Date of Patent: Mar. 29, 2022

(54) MITIGATING PARTICULATE MATTER EMISSION IN ENGINE EXHAUST

(71) Applicant: Saudi Arabian Oil Company, Dhahran (SA)

(72) Inventors: Remi Mahfouz, Al Khobar (SA); Tamour Javed, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 150 days.

(21) Appl. No.: 16/741,432

(22) Filed: Jan. 13, 2020

(65) Prior Publication Data

US 2021/0215073 A1   Jul. 15, 2021

(51) Int. Cl.
| | |
|---|---|
| *F01N 3/029* | (2006.01) |
| *H02S 10/40* | (2014.01) |
| *C25B 9/17* | (2021.01) |
| *B01D 46/00* | (2022.01) |
| *C25B 1/04* | (2021.01) |
| *F01N 3/025* | (2006.01) |
| *F01N 3/027* | (2006.01) |
| *F01N 5/02* | (2006.01) |
| *F02B 43/12* | (2006.01) |
| *F02B 43/10* | (2006.01) |

(52) U.S. Cl.
CPC ......... *F01N 3/0293* (2013.01); *B01D 46/006* (2013.01); *C25B 1/04* (2013.01); *C25B 9/17* (2021.01); *F01N 3/027* (2013.01); *F01N 3/0256* (2013.01); *F01N 5/025* (2013.01); *F02B 43/12* (2013.01); *H02S 10/40* (2014.12); *B01D 2279/30* (2013.01); *F02B 2043/106* (2013.01)

(58) Field of Classification Search
CPC ... F01N 3/027; F01N 2240/34; F01N 2610/04
See application file for complete search history.

(56) References Cited

U.S. PATENT DOCUMENTS

| | | |
|---|---|---|
| 6,915,629 B2 | 7/2005 | Symkowicz |
| 7,488,461 B2 | 2/2009 | Nagayasu et al. |
| 8,459,213 B2 | 6/2013 | Moriarty et al. |
| 8,463,495 B2 | 6/2013 | Spohn et al. |
| 8,741,244 B2 | 6/2014 | Jones |

(Continued)

FOREIGN PATENT DOCUMENTS

| | | |
|---|---|---|
| DE | 10142778 | 4/2003 |
| DE | 102012205534 | 10/2012 |

(Continued)

OTHER PUBLICATIONS

Machine translation of FR-2821116-A1, accessed Aug. 5, 2021. (Year: 2021).*

(Continued)

*Primary Examiner* — Jonathan R Matthias
(74) *Attorney, Agent, or Firm* — Fish & Richardson P.C.

(57) ABSTRACT

Exhaust gas is treated onboard a vehicle. Solar energy is converted into electricity, which is used to power an electrochemical cell mounted onboard the vehicle. Oxygen and hydrogen are produced by the electrochemical cell. Heat and the oxygen produced by the electrochemical cell are provided to a particulate matter filter onboard the vehicle, thereby oxidizing particulate matter disposed on the particulate matter filter.

16 Claims, 5 Drawing Sheets

(56) References Cited

U.S. PATENT DOCUMENTS

| | | | |
|---|---|---|---|
| 9,664,087 | B2 | 5/2017 | Sloss |
| 9,914,094 | B2 | 3/2018 | Jenkins et al. |
| 2006/0048506 | A1 | 3/2006 | Son |
| 2007/0138006 | A1* | 6/2007 | Oakes ................ H01M 8/0606 |
| | | | 204/278 |
| 2008/0000221 | A1 | 1/2008 | Silvis |
| 2008/0256933 | A1* | 10/2008 | Black .................... F02M 25/12 |
| | | | 60/295 |
| 2010/0005788 | A1 | 1/2010 | McConnell et al. |
| 2010/0018476 | A1 | 1/2010 | Zemskova et al. |
| 2010/0107994 | A1* | 5/2010 | Moriarty .................. F03G 7/08 |
| | | | 123/3 |
| 2011/0173953 | A1 | 7/2011 | Neels et al. |
| 2012/0255279 | A1* | 10/2012 | Atluri .................... F01N 3/027 |
| | | | 60/274 |
| 2014/0352301 | A1 | 12/2014 | Mueller |
| 2017/0122254 | A1 | 5/2017 | Urch et al. |
| 2017/0204762 | A1* | 7/2017 | Kotrba ..................... C25B 9/19 |
| 2018/0195469 | A1 | 7/2018 | Hamad et al. |
| 2018/0216543 | A1* | 8/2018 | Hoffmann ............... F02B 43/10 |
| 2018/0320586 | A1 | 11/2018 | Johnson et al. |
| 2019/0055868 | A1 | 2/2019 | Keturakis |

FOREIGN PATENT DOCUMENTS

| | | | | |
|---|---|---|---|---|
| DE | 102013017064 | | 4/2015 | |
| EP | 2693024 | | 2/2014 | |
| EP | 3124780 | | 2/2017 | |
| FR | 2821116 | A1 * | 8/2002 | ............ F01N 3/029 |
| FR | 2941499 | | 7/2010 | |
| JP | S61176227 | U * | 11/1986 | |
| JP | H09301740 | A * | 11/1997 | |
| WO | WO 2018185660 | | 10/2018 | |

OTHER PUBLICATIONS

Machine translation of JP S61-176227U, accessed Aug. 5, 2021. (Year: 2021).*

PCT International Search Report and Written Opinion issued in International Application No. PCT/US2021/013068 dated Mar. 16, 2021, 15 pages.

Orr et al., "A review of car waste heat recovery systems utilising thermoelectric generators and heat pipes," Applied Thermal Engineering, 101, pp. 490-495, Nov. 2015, 6 pages.

* cited by examiner

MITIGATING PARTICULATE MATTER EMISSION IN ENGINE EXHAUST

TECHNICAL FIELD

This disclosure relates to treatment of vehicle exhaust gas.

BACKGROUND

Particulate matter can be present in exhaust gas produced by vehicles during operation. Particulate matter, if released into the atmosphere, can contribute to air pollution. After treatments of the engine exhaust gas can be used to reduce the amount of particulate matter emitted by such vehicles. Improving efficiency and effectiveness of such after treatments can be a favorable environmental and commercial endeavor.

SUMMARY

This disclosure describes technologies relating to treatment of vehicle exhaust gas, and more specifically, mitigating soot and particulate matter (PM) emissions in engine exhausts.

In a first general aspect, a method is implemented for treating exhaust gas onboard a vehicle. A photovoltaic cell mounted onboard the vehicle and coupled to an electrochemical cell converts solar energy into electricity. The electrochemical cell mounted onboard the vehicle is powered by using the electricity converted by the photovoltaic cell. The electrochemical cell produces a first oxygen stream and a first hydrogen stream. Heat and the first oxygen stream is provided to a particulate matter filter onboard the vehicle, thereby oxidizing particulate matter disposed on the particulate matter filter.

In a second general aspect, an onboard vehicle exhaust gas treating system includes a photovoltaic cell, an electrochemical cell, and an oxygen flow pathway. The photovoltaic cell is configured to mount to a vehicle and convert solar energy into electricity. The electrochemical cell is configured to mount to the vehicle. The electrochemical cell is configured to couple to the photovoltaic cell. The electrochemical cell is configured to produce a first oxygen stream and a first hydrogen stream in response to receiving power from the photovoltaic cell. The oxygen flow pathway is configured to flow the first oxygen stream from the electrochemical cell to a particulate matter filter of the vehicle.

The first and second general aspects, taken alone or in combination, can include one or more of the following features.

In some implementations, producing the first oxygen stream and the first hydrogen stream includes recovering water from an engine exhaust gas generated by the vehicle during vehicle operation and electrolyzing the recovered water.

In some implementations, the first hydrogen stream is provided to an engine of the vehicle.

In some implementations, the first hydrogen stream is combusted to produce heat. In some implementations, the heat produced from combusting the first hydrogen stream is provided to the particulate matter filter.

In some implementations, the first hydrogen stream is combusted using an ignition device positioned near the particulate matter filter, thereby burning particulate matter disposed on the particulate matter filter.

In some implementations, a waste heat recovery system mounted onboard the vehicle and coupled to an engine exhaust gas recovers energy from the engine exhaust gas. In some implementations, the waste heat recovery system converts the recovered energy to electricity. In some implementations, the electrochemical cell is powered by using the electricity converted by the waste heat recovery system.

In some implementations, an electric heater is powered by using at least one of the electricity converted by the photovoltaic cell or the electricity converted by the waste heat recovery system. The electric heater generates heat in response to the powering. In some implementations, the particulate matter filter is heated by using the heat generated by the electric heater.

In some implementations, a solar collector mounted onboard the vehicle and coupled to a photocatalytic cell mounted onboard the vehicle collects sunlight. In some implementations, an optical fiber transports the collected sunlight to the photocatalytic cell. In some implementations, the photocatalytic cell produces a second oxygen stream and a second hydrogen stream in response to receiving the collected sunlight. In some implementations, the second oxygen stream is provided to the particulate matter filter.

In some implementations, producing the second oxygen stream and the second hydrogen stream includes recovering water from the engine exhaust gas and photo-catalytically splitting the recovered water.

In some implementations, the second hydrogen stream is provided to an engine of the vehicle.

In some implementations, the second hydrogen stream is combusted to produce heat. In some implementations, the heat produced from combusting the second hydrogen stream is provided to the particulate matter filter.

In some implementations, the system includes a waste heat recovery system. In some implementations, the waste heat recovery system includes at least one of a thermoelectric generator or a turbine. In some implementations, the waste heat recovery system is configured to mount to the vehicle. In some implementations, the waste heat recovery system is configured to couple to an engine exhaust outlet of the vehicle. In some implementations, the waste heat recovery system is configured to recover energy from the engine exhaust gas. In some implementations, the waste heat recovery system is configured to convert the recovered energy to electricity. In some implementations, the waste heat recovery system is configured to deliver the electricity to the electrochemical cell.

In some implementations, the system includes an electric heater. In some implementations, the electric heater is configured to mount to the vehicle. In some implementations, the electric heater is configured to couple to at least one of the photovoltaic cell or the waste heat recovery system. In some implementations, the electric heater is configured to generate heat in response to receiving electricity from at least one of the photovoltaic cell or the waste heat recovery system.

In some implementations, the system includes a hydrogen flow pathway configured to flow the first hydrogen stream from the electrochemical cell to an engine of the vehicle.

In some implementations, the system includes a hydrogen flow pathway configured to flow the first hydrogen stream from the electrochemical cell to an ignition device positioned near the particulate matter filter.

In some implementations, the system includes a solar collector, an optical fiber, and a photocatalytic cell. In some implementations, the solar collector is configured to mount to the vehicle and collect sunlight. In some implementations, the optical fiber is configured to transport the collected sunlight from the solar collector to the photocatalytic cell. In some implementations, the photocatalytic cell is configured to mount to the vehicle and produce a second oxygen stream and a second hydrogen stream in response to receiving the collected sunlight.

In some implementations, the system includes a hydrogen flow pathway configured to flow the second hydrogen stream from the photocatalytic cell to an engine of the vehicle.

In some implementations, the system includes a hydrogen flow pathway configured to flow the second hydrogen stream from the photocatalytic cell to an ignition device positioned near the particulate matter filter.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes treatment of vehicle exhaust gas. The technology described here generally relates to mitigating soot and particulate matter (PM) emissions in engine exhausts, including for example, in diesel engine exhausts and in gasoline engine exhausts. The subject matter described in this disclosure can be implemented in particular implementations, so as to realize one or more of the following advantages. The PM emissions can be mitigated by oxidization of the PM into less harmful products, such as carbon dioxide and water vapor. For gasoline engines, oxygen and heat can be provided to aid the oxidization of the PM. For diesel engines, heat can be provided to aid the oxidization of the PM, and in cases where additional oxygen would improve the oxidation of the PM, oxygen can also be provided. The oxygen can be provided, for example, by onboard generation of oxygen through electrochemical water splitting, by onboard generation of oxygen through photocatalytic water splitting, by supply of air, or a combination of these. In some implementations, heat is provided by onboard waste heat recovery, by solar flux collected from the roof of the vehicle or elsewhere on the vehicle, by electricity generated onboard by a photovoltaic, combustion of hydrogen generated from onboard water splitting, or a combination of these. In some implementations, one or more components are powered by onboard waste heat recovery, by onboard conversion of solar flux collected from the roof of the vehicle or elsewhere on the vehicle, by electricity generated onboard by a photovoltaic, by electricity generated onboard by photocatalytic water splitting, or a combination of these. Therefore, heat that is typically wasted or dissipated to the surrounding environment can be recovered and converted to energy. Furthermore, each of the components of the described technology can be mounted onboard a vehicle. For example, all components of the described technology are configured such that the entire system is onboard the vehicle and can therefore travel with the vehicle and be used while the vehicle is in operation. The described technology can be implemented in vehicles with engines that operate or compression ignition or that use an igniter, like spark plug, heat plug, or other type of ignitor.

Figure 1A:
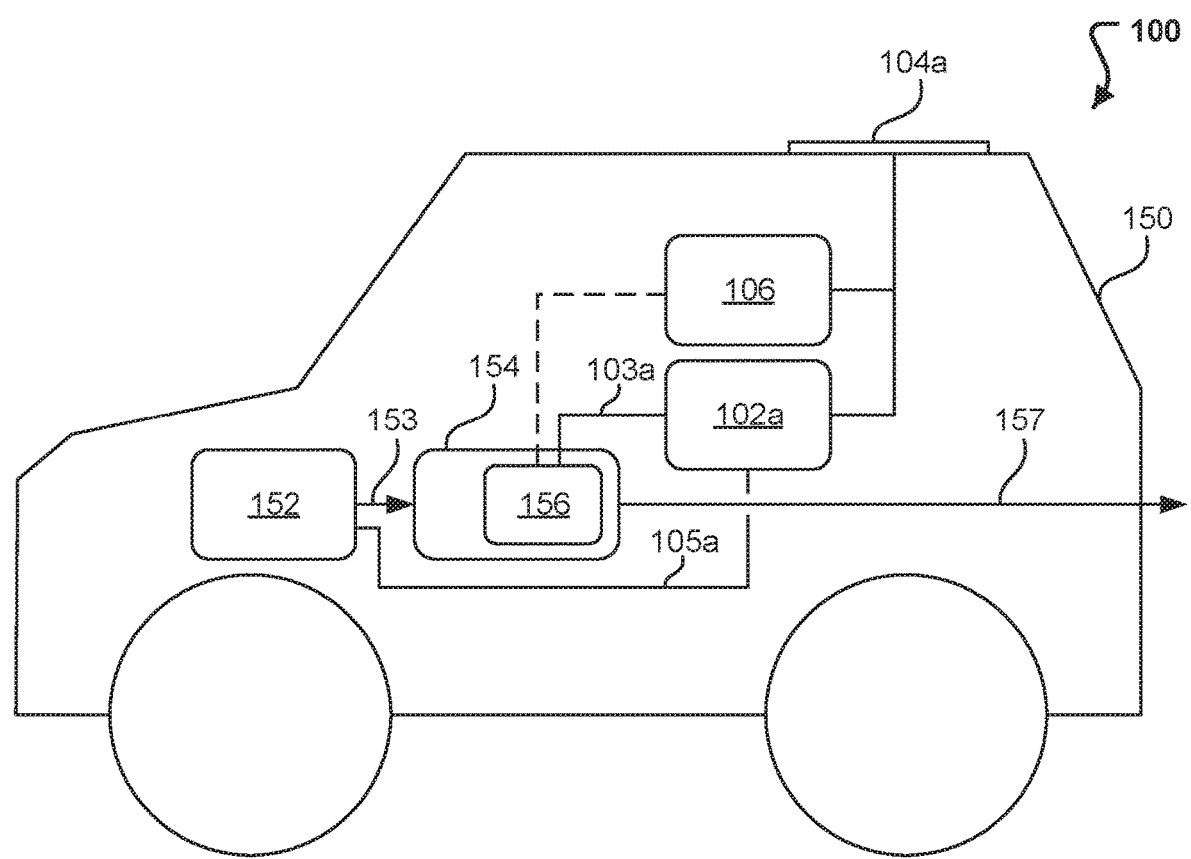
FIG. 1A is a schematic diagram of an implementation of an example system that can be used to treat vehicle exhaust gas.

FIG. 1A shows a vehicle exhaust gas treating system 100 onboard a vehicle 150. The vehicle 150 includes an engine 152. In some implementations, the vehicle 150 includes an after treatment system 154. In some implementations, the after treatment system 154 is configured to treat an exhaust gas 153 produced by the engine 152 during operation of the vehicle 150. In some implementations, the after treatment system 154 can include a particulate matter filter 156. The treated exhaust gas 157 is emitted from the vehicle 150.

In some implementations, the vehicle exhaust gas treating system 100 supplements the after treatment system 154. The vehicle exhaust gas treating system 100 is configured to mount to the vehicle 150. In some implementations, the vehicle exhaust gas treating system 100 includes an electrochemical cell 102a, a photovoltaic cell 104a, and an electric heater 106. In some implementations, the electrochemical cell 102a is coupled to the photovoltaic cell 104a. In some implementations, the electric heater 106 is coupled to the photovoltaic cell 104a.

The electrochemical cell 102a is configured to hold water. The electrochemical cell 102a includes electrodes. Each of the electrodes can include, for example, platinum, stainless steel, or iridium. In some implementations, the electrodes of the electrochemical cell 102a are connected to and powered by the photovoltaic cell 104a. The electrochemical cell 102a is configured to produce oxygen and hydrogen by electrolysis of water in response to receiving power. In some implementations, the electrochemical cell 102a is powered entirely or partially by the photovoltaic cell 104a. In some implementations, water is recovered, condensed, or both from the engine exhaust gas 153. In some implementations, water is supplied by an auxiliary water tank that can be filled, for example, by the end-user.

In some implementations, the system 100 includes an oxygen flow pathway 103a configured to flow oxygen from the electrochemical cell 102a to the particulate matter filter 156. The oxygen provided to the particulate matter filter 156 can cause particulate matter (disposed on the particulate matter filter 156) to oxidize. Oxidation of the particulate matter can convert the particulate matter into gaseous components, such as carbon dioxide and water vapor. Conversion of the particulate matter into gaseous components, in turn, regenerates the particulate matter filter 156.

In some implementations, the system 100 includes a hydrogen flow pathway 105a configured to flow hydrogen from the electrochemical cell 102a to the engine 152, where the hydrogen can mix with fuel and be combusted. In the case that the engine 152 is a spark ignition engine, adding hydrogen to the engine 152 (for example, to its combustion chamber) can improve overall efficiency, can improve engine operation, and can reduce the amount of emissions produced by the engine 152. In the case that the engine 152 is a compression ignition engine, adding hydrogen to the engine 152 (for example, to its combustion chamber) can reduce the amount of nitrous oxide and soot in emissions, promote auto-ignition of non-diesel fuels (for example, gasoline), or both.

In some implementations, the system 100 includes a hydrogen flow pathway configured to flow hydrogen from the electrochemical cell 102a to an ignition device positioned near the particulate matter filter 156. The ignition device can combust the hydrogen, and the combustion of hydrogen in the vicinity of the particulate matter filter 156 can cause particulate matter disposed on the particulate matter filter 156 to burn. The combustion of hydrogen in the vicinity of the particulate matter filter 156 can also cause the temperature of the particulate matter filter 156 to increase. The combustion of hydrogen itself does not result in the production of carbon dioxide.

The photovoltaic cell 104a is configured to convert solar energy into electricity. The photovoltaic cell 201 is a device whose electric characteristics, such as current, voltage, or resistance, vary when exposed to light (for example, light from the sun). The photovoltaic cell 201 includes a semiconducting material (for example, silicon) that can absorb photons (for example, from sunlight). In some implementations, the photovoltaic cell 201 converts solar energy into direct current (DC) electricity. In some implementations, the photovoltaic cell 201 includes an inverter that converts the power to alternating current (AC).

The electric heater 106 is an electrical device that converts electric power into heat. In some implementations, the electric heater 106 includes a heating element that is an electric resister. As electric current passes through the resister, electrical energy is converted into heat energy. The resister can, for example, be made of nichrome. In some implementations, the electric heater 106 is powered entirely or partially by the photovoltaic cell 104a. In some implementations, the heat generated by the electric heater 106 is used to increase the temperature of the particulate matter filter 156. In some implementations, the electric heater 106 is configured to heat the particulate matter filter 156 to a temperature of about 500 degrees Celsius (° C.) or greater. For example, the electric heater 106 can be configured to heat the particulate matter filter 156 to a temperature of about 550° C., about 600° C., or about 650° C. Increasing the temperature of the particulate matter filter 156 to a temperature of about 500° C. or greater can improve oxidation of the particulate matter (for example, disposed on the particulate matter filter 156 or flowing with the exhaust gas). Increasing the temperature of the particulate matter filter 156 to a temperature of about 500° C. or greater can accelerate oxidation of the particulate matter (for example, disposed on the particulate matter filter 156 or flowing with the exhaust gas) to a rate that is quick enough to reduce the amount of particulate matter that is emitted from the vehicle 150 to an acceptable level (for example, less than 3 milligrams per mile (mg/mi) or less than 1 mg/mi).

In some implementations, the hydrogen produced by the electrochemical cell 102a (or a portion of the hydrogen produced by the electrochemical cell 102a) is combusted to produce heat, which can be used to increase the temperature of the particulate matter filter 156. In some implementations, heat produced from combusting hydrogen is provided to the particulate matter filter 156 alternative to or in combination with the heat generated by the electric heater 106.

Figure 1B:
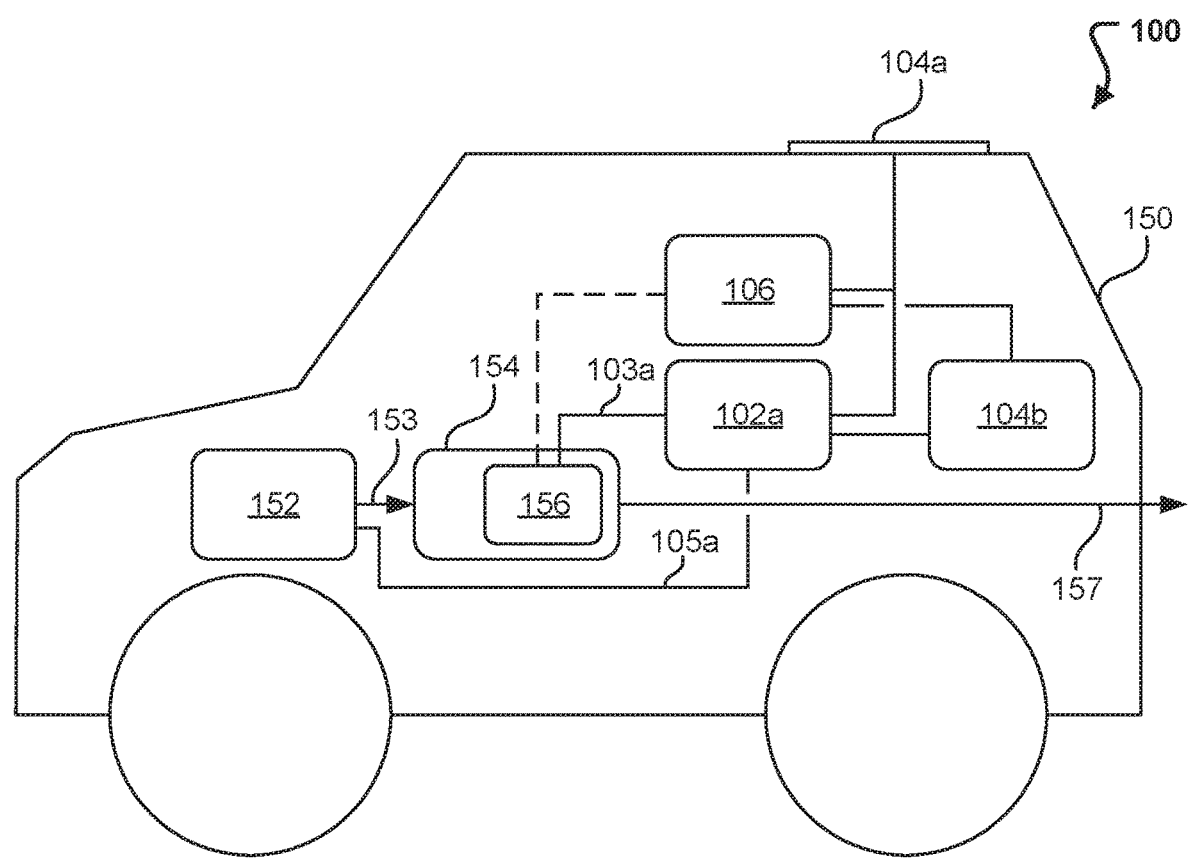
FIG. 1B is a schematic diagram of another implementation of an example system that can be used to treat vehicle exhaust gas.

FIG. 1B shows the system 100 including a waste heat recovery system 104b. The waste heat recovery system 104b can recover energy from the exhaust gas 153. In some implementations, the waste heat recovery system 104b is coupled to the engine exhaust gas 153. Any type of waste heat recovery system suitable for recovering energy from the exhaust gas 153 can be used in the system 100. For example, in some implementations, the system 100 includes thermo-electric conversion or turbo-compounding. The waste heat recovery system 104b can convert the recovered energy to electricity. In some implementations, the recovered energy or electricity is used to power other units or processes in the system 100. In some implementations, the waste heat recovery system 104b includes at least one of a thermoelectric generator or a turbine. For example, in some implementations, the waste heat recovery system 104b includes a Rankine cycle that includes a turbine.

In some implementations, the electricity generated by the waste heat recovery system 104b is used to power other units or processes in the system 100 alternative to or in combination with the electricity generated by the photovoltaic cell 104a. For example, the electrochemical cell 102a is powered (a) partially by the photovoltaic cell 104a, (b) partially by the waste heat recovery system 104b, (c) partially by the photovoltaic cell 104a and partially by the waste heat recovery system 104b, (d) entirely by the photovoltaic cell 104a, or (e) entirely by the waste heat recovery system 104b. For example, the electric heater 106 is powered (a) partially by the photovoltaic cell 104a, (b) partially by the waste heat recovery system 104b, (c) partially by the photovoltaic cell 104a and partially by the waste heat recovery system 104b, (d) entirely by the photovoltaic cell 104a, or (e) entirely by the waste heat recovery system 104b.

Figure 1C:
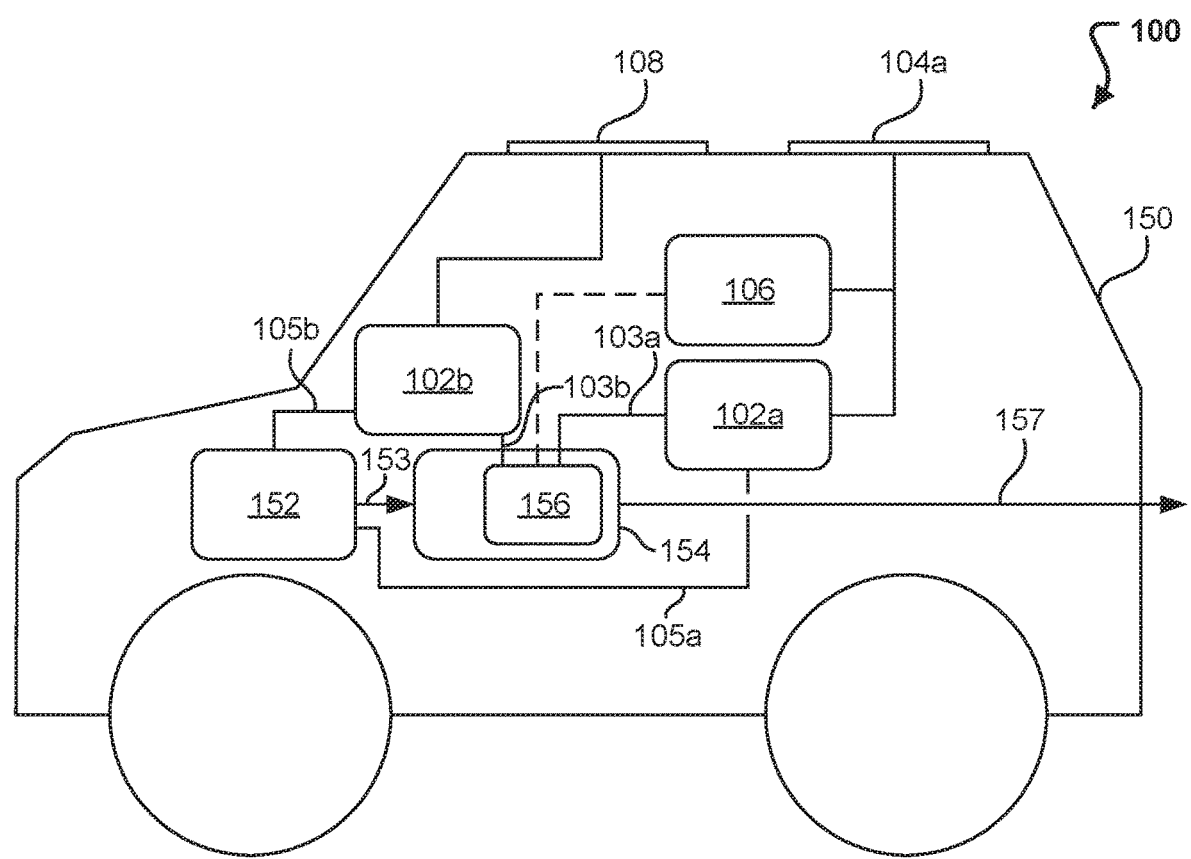
FIG. 1C is a schematic diagram of another implementation of an example system that can be used to treat vehicle exhaust gas.

FIG. 1C shows the system 100 including a photocatalytic cell 102b and a solar collector 108. The photocatalytic cell 102b is configured to produce oxygen and hydrogen by photo-catalysis of water. Some non-limiting examples of photocatalysts include: cadmium zinc sulfide ($Cd_{1-x}Zn_xS$, where $0.2<x<0.35$); sodium tantalum oxide doped with lanthanum ($NaTaO_3$:La); potassium tantalum borate ($K_3Ta_3B_2O_{12}$); photocatalysts that include gallium, zinc, nitrogen, and oxygen; photocatalysts based on cobalt, bismuth vanadate, or tungsten diselenide ($WSe_2$); titanium dioxide ($TiO_2$); and photocatalysts based on III-V semiconductors (such as indium gallium phosphide, InGaP).

In some implementations, the photocatalytic cell 102b includes a photocatalyst and a container made of glass or plastic. The photocatalytic cell 102b is configured to hold water. In some implementations, water is recovered, condensed, or both from the engine exhaust gas 153. In some implementations, water is supplied by an auxiliary water tank that can be filled, for example, by the end-user.

The solar collector 108 is a device that collects sunlight, concentrates sunlight, or both. The solar collector 108 is connected to the photocatalytic cell 102b. For example, the solar collector 108 is connected to the photocatalytic cell 102b by an optical fiber. The optical fiber transports the collected sunlight from the solar collector 108 to the photocatalytic cell 102b. In response to receiving the collected sunlight, the photocatalytic cell 102b splits water to produce oxygen and hydrogen.

In some implementations, the system 100 includes an oxygen flow pathway 103b configured to flow oxygen from the photocatalytic cell 102b to the particulate matter filter 156. In some implementations, the system 100 includes a hydrogen flow pathway 105b configured to flow hydrogen from the photocatalytic cell 102b to the engine 152, where the hydrogen can mix with fuel and be combusted.

In some implementations, the system 100 includes a hydrogen flow pathway configured to flow hydrogen from the photocatalytic cell 102b to an ignition device positioned near the particulate matter filter 156. The ignition device can combust the hydrogen, and the combustion of hydrogen in the vicinity of the particulate matter filter 156 can cause particulate matter disposed on the particulate matter filter 156 to burn. The combustion of hydrogen in the vicinity of the particulate matter filter 156 can also cause the temperature of the particulate matter filter 156 to increase. The combustion of hydrogen itself does not result in the production of carbon dioxide.

In some implementations, the hydrogen produced by the photocatalytic cell 102b (or a portion of the hydrogen produced by the photocatalytic cell 102b) is combusted to produce heat, which can be used to increase the temperature of the particulate matter filter 156. In some implementations, heat produced from combusting hydrogen is provided to the particulate matter filter 156 alternative to or in combination with the heat generated by the electric heater 106.

In some implementations, the system 100 includes a lamp that can be powered to produce photons for use by the photocatalytic cell 102b in photo-catalytically splitting water to produce oxygen and hydrogen. The photons produced by the lamp can supplement the sunlight collected by the solar collector 108. Electricity from the photovoltaic cell 104a, from the waste heat recovery system 104b, or from both can be used to power the lamp. For example, the lamp is powered (a) partially by the photovoltaic cell 104a, (b) partially by the waste heat recovery system 104b, (c) partially by the photovoltaic cell 104a and partially by the waste heat recovery system 104b, (d) entirely by the photovoltaic cell 104a, or (e) entirely by the waste heat recovery system 104b.

Figure 1D:
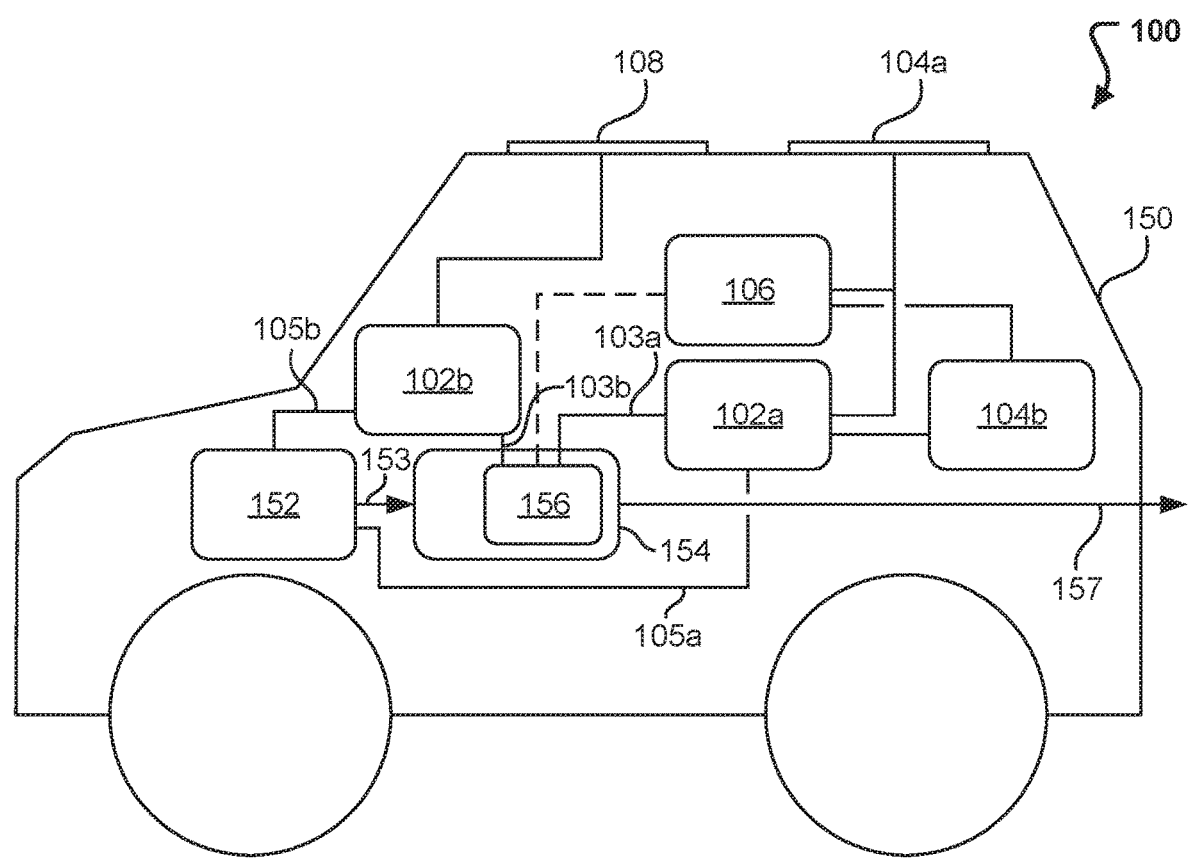
FIG. 1D is a schematic diagram of another implementation of an example system that can be used to treat vehicle exhaust gas.

FIG. 1D illustrates an implementation of the system 100 that includes all of the aforementioned components: the electrochemical cell 102a, photocatalytic cell 102b, photovoltaic cell 104a, waste heat recovery system 104b, electric heater 106, solar collector 108, oxygen flow pathways 103a and 103b, and hydrogen flow pathways 105a and 105b. In some implementations, the system 100 includes a hydrogen flow pathway configured to flow hydrogen from the at least one of the electrochemical cell 102a or the photocatalytic cell 102b to an ignition device positioned near the particulate matter filter 156. The ignition device can combust the hydrogen, and the combustion of hydrogen in the vicinity of the particulate matter filter 156 can cause particulate matter disposed on the particulate matter filter 156 to burn. The combustion of hydrogen in the vicinity of the particulate matter filter 156 can also cause the temperature of the particulate matter filter 156 to increase. The combustion of hydrogen itself does not result in the production of carbon dioxide.

Figure 2:
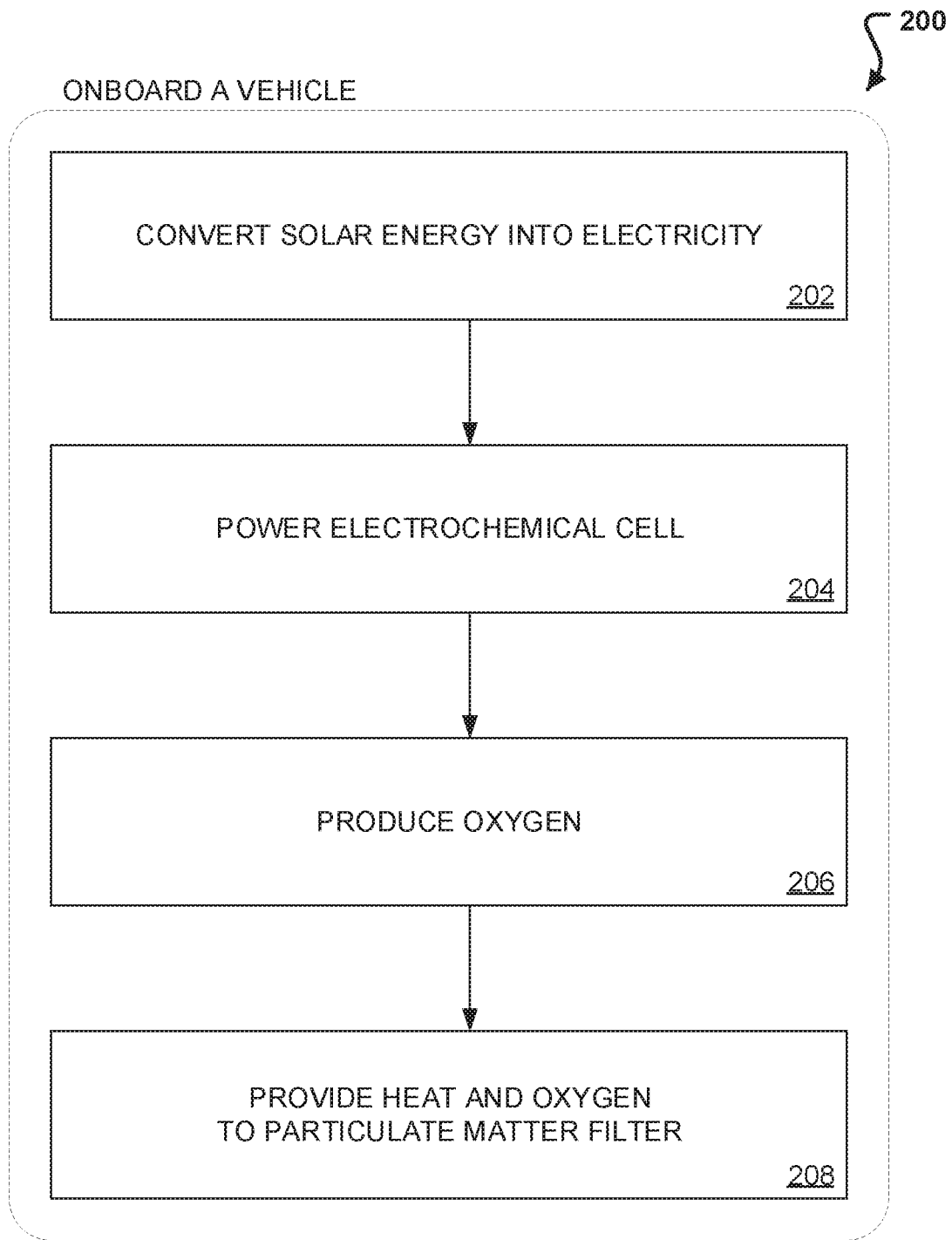
FIG. 2 is a flow chart of an example method for treating vehicle exhaust gas.

FIG. 2 is a flow chart of an example method 200 for treating exhaust gas (for example, the exhaust gas 153 from engine 152) onboard a vehicle (for example, the vehicle 150). The method 200 can be implemented, for example, by the system 100. At step 202, solar energy is converted into electricity. In some implementations, solar energy is converted into electricity at step 202 by a photovoltaic cell (for example, the photovoltaic cell 104a) onboard the vehicle 150. In some implementations, the photovoltaic cell 104a is coupled to an electrochemical cell (for example, the electrochemical cell 102a).

In some implementations, energy is recovered from the engine exhaust gas 153. In some implementations, the energy from the engine exhaust gas 153 is recovered by a waste heat recovery system mounted onboard the vehicle 150 and coupled to an engine exhaust outlet (for example, the waste heat recovery system 104b). In some implementations, the waste heat recovery system 104b converts the recovered energy to electricity.

At step 204, the electrochemical cell 102a is powered. In some implementations, the electrochemical cell 102a is powered at step 204 by using the electricity converted by the photovoltaic cell 104a at step 202. In some implementations, the electrochemical cell 102a is powered at step 204 by using the electricity converted by the waste heat recovery system 104b. In some implementations, the electrochemical cell 102a is powered at step 204 by using the electricity converted by the photovoltaic cell 104a at step 202 and the electricity converted by the waste heat recovery system 104b.

At step 206, oxygen is produced. In some implementations, oxygen is produced at step 206 by electrolysis of water by the electrochemical cell 102a in response to being powered at step 204. Electrolysis of water also produces hydrogen. Therefore, in some implementations, oxygen and hydrogen are produced by the electrochemical cell 102a at step 206.

In some implementations, water is recovered, condensed, or both from the engine exhaust gas 153. The recovered water can be electrolyzed by the electrochemical cell 102a. In some implementations, water is supplied to the electrochemical cell 102a by an auxiliary water tank that can be filled, for example, by the end-user.

At step 208, heat and oxygen is provided to a particulate matter filter (for example, the particulate matter filter 156). Providing heat and oxygen to the particulate matter filter 156 at step 208 can cause oxidation of particulate matter disposed on the particulate matter filter 156.

In some implementations, an electric heater (for example, the electric heater 106) is powered to generate heat. In some implementations, the electric heater 106 is powered by using at least one of the electricity converted by the photovoltaic cell 104a at step 202 or the electricity converted by the waste heat recovery system 104b. In some implementations, the heat generated by the electric heater 106 is provided to the particulate matter filter 156 at step 208.

In some implementations, hydrogen produced by the electrochemical cell 102a is provided to an engine of the vehicle 150 (for example, the engine 152). In some implementations, hydrogen produced by the electrochemical cell 102a is combusted to produce heat. In some implementations, the heat produced from combusting hydrogen is provided to the particulate matter filter 156 at step 208.

In some implementations, hydrogen produced by the electrochemical cell 102a is provided to an ignition device positioned near the particulate matter filter 156. The ignition device combusts the hydrogen, and the combustion of hydrogen in the vicinity of the particulate matter filter 156 can cause particulate matter disposed on the particulate matter filter 156 to burn. The combustion of hydrogen in the vicinity of the particulate matter filter 156 can also cause the temperature of the particulate matter filter 156 to increase.

In some implementations, sunlight is collected by a solar collector mounted onboard the vehicle 150 (for example, the solar collector 108). In some implementations, the solar collector 108 is coupled to a photocatalytic cell mounted onboard the vehicle 150 (for example, the photocatalytic cell 102b). In some implementations, the collected sunlight is transported to the photocatalytic cell 102b by an optical fiber. In response to receiving the collected sunlight, the photocatalytic cell 102b produces oxygen and hydrogen. In some implementations, the oxygen produced by the photocatalytic cell 102b is provided to the particulate matter filter 156 at step 208.

In some implementations, water is recovered, condensed, or both from the engine exhaust gas 153. The recovered water can be photo-catalytically split by the photocatalytic cell 102b. In some implementations, water is supplied to the photocatalytic cell 102*b* by an auxiliary water tank that can be filled, for example, by the end-user.

In some implementations, hydrogen produced by the photocatalytic cell 102*b* is provided to an engine of the vehicle 150 (for example, the engine 152). In some implementations, hydrogen produced by the photocatalytic cell 102*b* is combusted to produce heat. In some implementations, the heat produced from combusting hydrogen is provided to the particulate matter filter 156 at step 208.

In some implementations, hydrogen produced by the photocatalytic cell 102*b* is provided to an ignition device positioned near the particulate matter filter 156. The ignition device combusts the hydrogen, and the combustion of hydrogen in the vicinity of the particulate matter filter 156 can cause particulate matter disposed on the particulate matter filter 156 to burn. The combustion of hydrogen in the vicinity of the particulate matter filter 156 can also cause the temperature of the particulate matter filter 156 to increase.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method for treating exhaust gas onboard a vehicle, the method comprising:
converting, by a photovoltaic cell mounted onboard the vehicle and coupled to an electrochemical cell, solar energy into electricity;
powering the electrochemical cell mounted onboard the vehicle by using the electricity converted by the photovoltaic cell;
recovering water from exhaust gas generated by a gasoline or diesel engine, the exhaust gas emitted from the vehicle during vehicle operation;
producing, by the electrochemical cell, a first oxygen stream and a first hydrogen stream by electrolyzing the water recovered from the gasoline or diesel engine exhaust gas; and
providing heat and the first oxygen stream to a particulate matter filter onboard the vehicle, thereby oxidizing particulate matter disposed on the particulate matter filter.

2. The method of claim 1, comprising providing the first hydrogen stream to an engine of the vehicle.

3. The method of claim 1, comprising combusting the first hydrogen stream to produce heat, wherein providing heat to the particulate matter filter comprises providing the heat produced from combusting the first hydrogen stream.

4. The method of claim 1, comprising combusting the first hydrogen stream using an ignition device positioned near the particulate matter filter, thereby burning particulate matter disposed on the particulate matter filter.

5. The method of claim 1, comprising:
recovering, by a waste heat recovery system mounted onboard the vehicle and coupled to an engine exhaust outlet, energy from the engine exhaust gas;
converting, by the waste heat recovery system, the recovered energy to electricity;
powering the electrochemical cell by using the electricity converted by the waste heat recovery system.

6. The method of claim 5, comprising powering an electric heater by using at least one of the electricity converted by the photovoltaic cell or the electricity converted by the waste heat recovery system, wherein the electric heater generates heat in response to the powering, and heating the particulate matter filter comprises using the heat generated by the electric heater.

7. The method of claim 1, comprising:
collecting, by a solar collector mounted onboard the vehicle and coupled to a photocatalytic cell mounted onboard the vehicle, sunlight;
transporting, by an optical fiber, the collected sunlight to the photocatalytic cell;
producing, by the photocatalytic cell, a second oxygen stream and a second hydrogen stream in response to receiving the collected sunlight; and
providing the second oxygen stream to the particulate matter filter.

8. The method of claim 7, wherein producing the second oxygen stream and the second hydrogen stream comprises recovering water from the engine exhaust gas and photocatalytically splitting the recovered water.

9. The method of claim 7, comprising providing the second hydrogen stream to an engine of the vehicle.

10. The method of claim 7, comprising combusting the second hydrogen stream to produce heat, wherein providing heat to the particulate matter filter comprises providing the heat produced from combusting the second hydrogen stream.

11. An onboard vehicle exhaust gas treating system, the system comprising:
a gasoline or diesel engine configured to emit an exhaust gas from the vehicle during vehicle operation;
a photovoltaic cell configured to mount to a vehicle and convert solar energy into electricity;

an electrochemical cell mounted to the vehicle and coupled to the photovoltaic cell, the electrochemical cell configured to produce, in response to receiving power from the photovoltaic cell, a first oxygen stream and a first hydrogen stream by electrolyzing water recovered from the gasoline or diesel engine exhaust gas; and an oxygen flow pathway configured to flow the first oxygen stream from the electrochemical cell to a particulate matter filter of the vehicle.

12. The system of claim 11, comprising a waste heat recovery system comprising at least one of a thermoelectric generator or a turbine, the waste heat recovery system configured to:

mount to the vehicle;

couple to a gasoline or diesel engine exhaust outlet of the vehicle;

recover energy from the gasoline or diesel engine exhaust gas emitted from the vehicle;

convert the recovered energy to electricity; and deliver the electricity to the electrochemical cell.

13. The system of claim 12, comprising an electric heater configured to mount to the vehicle, couple to at least one of the photovoltaic cell or the waste heat recovery system, and generate heat in response to receiving electricity from at least one of the photovoltaic cell or the waste heat recovery system.

14. The system of claim 11, comprising a hydrogen flow pathway configured to flow the first hydrogen stream from the electrochemical cell to an engine of the vehicle.

15. The system of claim 11, comprising:

a solar collector configured to mount to the vehicle and collect sunlight;

an optical fiber configured to transport the collected sunlight from the solar collector to a photocatalytic cell; and the photocatalytic cell configured to mount to the vehicle and produce a second oxygen stream and a second hydrogen stream in response to receiving the collected sunlight.

16. The system of claim 15, comprising a hydrogen flow pathway configured to flow the second hydrogen stream from the photocatalytic cell to an engine of the vehicle.

* * * * *